(12) United States Patent
Cannon

(10) Patent No.: US 7,009,777 B2
(45) Date of Patent: Mar. 7, 2006

(54) COMPACT PROJECTION LENSES FOR USE WITH LARGE FORMAT PIXELIZED PANELS

(75) Inventor: Bruce L. Cannon, Portland, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/858,786

(22) Filed: Jun. 2, 2004

(65) Prior Publication Data

US 2005/0270658 A1  Dec. 8, 2005

(51) Int. Cl.
G02B 9/00 (2006.01)

(52) U.S. Cl. .................. 359/649; 359/761; 359/770

(58) Field of Classification Search ............... 359/649, 359/651, 752–756, 761, 770, 781–783
See application file for complete search history.

(56) References Cited

U.S. PATENT DOCUMENTS

| | | |
|---|---|---|
| 5,042,929 A | 8/1991 | Tanaka et al. |
| 5,218,480 A | 6/1993 | Moskovich |
| 5,625,495 A | 4/1997 | Moskovich |
| 5,710,669 A | 1/1998 | Endo |
| 5,812,326 A | 9/1998 | Yamada |
| 6,195,209 B1 | 2/2001 | Kreitzer et al. |
| 6,273,570 B1 | 8/2001 | Clifton et al. |
| 6,324,014 B1 | 11/2001 | Moskovich |
| 6,476,974 B1 * | 11/2002 | Kreitzer ................. 359/649 |
| 6,765,731 B1 * | 7/2004 | Cannon ................. 359/793 |
| 6,853,493 B1 * | 2/2005 | Kreitzer ................. 359/651 |
| 2002/0141072 A1 | 10/2002 | Moskovich |
| 2003/0011895 A1 | 1/2003 | Mort |

FOREIGN PATENT DOCUMENTS

WO     WO 99/26090       5/1999

OTHER PUBLICATIONS

Dunham, C.B., and C.R. Crawford, "Minimax Approximation by a Semi-Circle," Society for Industrial and Applied Mathematics, vol. 17, No. 1, Feb. 1980, pp. 63-65.

U.S. Appl. No. 10/858,777 entitled "Color-Corrected Projection Lenses for use with Pixilized Panels", Attorney Docket No. 59141US002 filed on Jun. 2, 2004.

* cited by examiner

Primary Examiner—Scott J. Sugarman
Assistant Examiner—Darryl J. Collins
(74) Attorney, Agent, or Firm—George W. Jonas

(57) ABSTRACT

Projection lenses for use with pixelized panels (PP) are provided. The projection lenses have first and second lens units (U1,U2), with the first lens unit having a negative or weakly positive power and the second lens unit having a positive power. The second lens unit has first and second subunits (U2S1 and U2S2) which provide positive power followed by negative power. The second subunit (U2S2) of the second unit (U2), in turn, has negative power followed by positive power. In this way, an overall short projection lens (e.g., $BRL/f_0 \leq 0.9$) along with small lens elements (e.g., $CA_{max}/f_0 \leq 0.8$) can be achieved.

24 Claims, 5 Drawing Sheets

COMPACT PROJECTION LENSES FOR USE WITH LARGE FORMAT PIXELIZED PANELS

FIELD OF THE INVENTION

This invention relates to projection lenses and, in particular, to projection lenses for use in forming an image of an object composed of pixels, such as, a DMD, a reflective LCD, a transmissive LCD, or the like. The lenses are particularly well-suited for use with large format transmissive LCDs, e.g., LCDs having a diagonal on the order of 10 inches (250 millimeters) or more.

BACKGROUND OF THE INVENTION

A. Definitions

As used in this specification and in the claims, the following terms shall have the following meanings:

(1) Optical Component.

An optical component is a component which has optical power and/or corrects one or more monochromatic and/or one or more chromatic aberrations and which requires separate mounting and alignment from other components of the projection lens.

As illustrated by the examples present below, optical components include, for example, single lens elements and cemented doublets. Projection lenses having less optical components are preferred to projection lenses having more optical components because having less components simplifies assembly and generally results in a reduction in a projection lens' weight and component cost.

(2) Barrel Length

Barrel length (BRL) is the distance between the vertex of the front surface of the forward-most optical component of the projection lens and the vertex of the back surface of the rearward-most optical component.

(3) Power of a Lens Surface

In terms of the long conjugate and short conjugate sides of the projection lens, the power of a lens surface S of the projection lens is given by:

$$\theta_S = (n_{SC} - n_{LC})/(n_{LC} \cdot R)$$

where $n_{SC}$ and $n_{LC}$ are the indices of refraction on the short and long conjugate sides of the surface, respectively, and R is the radius of curvature of the surface at the point at which the power of the lens surface is being determined, e.g., the radius of curvature on-axis or at the clear aperture, which, in accordance with conventional practice, is positive when the center of curvature is on the short conjugate side of the surface.

B. Projection Systems

Image projection systems are used to form an image of an object, such as a display panel, on a viewing screen. Such systems can be of the front projection or rear projection type, depending on whether the viewer and the object are on the same side of the screen (front projection) or on opposite sides of the screen (rear projection).

FIG. 5 shows in simplified form the basic components of an image projection system 17 for use with a pixelized imaging device (also known in the art as a "digital light valve"). In this figure, 10 is an illumination system, which comprises a light source 11 and illumination optics 12 which transfer some of the light from the light source towards the screen, 13 is the imaging device, and 14 is a projection lens which forms an enlarged image of the imaging device on viewing screen 15. For front projection systems, the viewer will be on the left side of screen 15 in FIG. 5, while for rear projection systems, the viewer will be on the right side of the screen.

For ease of presentation, FIG. 5 shows the components of the system in a linear arrangement. For a transmissive LCD imaging device and, in particular, for a rear projection system employing a large format transmissive LCD imaging device of the type with which the present invention will typically be used, the optical path between the imaging device and the screen preferably includes two folds so as to reduce the overall size of the cabinet used to house the system. In particular, a first fold mirror is preferably placed between imaging device 13 and projection lens 14 and a second fold mirror is preferably placed between the projection lens and screen 15.

The linear arrangement shown in FIG. 5 is also modified in the case of a reflective imaging device. Specifically, in this case, the illumination system is arranged so that light from that system reflects off of the imaging device, i.e., the light impinges on the front of the imaging device as opposed to the back of the device as shown in FIG. 5. Also, for such imaging devices, one or more prism assemblies will be located in front of the imaging device and will receive illumination light from the illumination system and will provide imaging light to the projection lens.

Image projection systems preferably employ a single projection lens which forms an image of: (1) a single imaging device which produces, either sequentially or simultaneously, the red, green, and blue components of the final image; or (2) three imaging devices, one for red light, a second for green light, and a third for blue light. Rather than using one or three imaging devices, some image projection systems have used two or up to six imagers. Also, for certain applications, e.g., large image rear projection systems, multiple projection lenses are used, with each lens and its associated imaging device(s) producing a portion of the overall image. In the preferred embodiments of the present invention, a single projection lens is used to form an image of a single imaging device, e.g., a large format transmissive LCD panel.

A particularly important application of projection systems employing pixelized panels is in the area of rear projection systems which can be used as large screen projection televisions (PTVs) and/or computer monitors. To compete effectively with the established cathode ray tube (CRT) technology, projection systems based on pixelized panels need to be smaller in size and lower in weight than CRT systems having the same screen size.

C. Optical Performance

To display images having a high information content (e.g., to display data), a projection lens needs to have a high level of aberration correction. In particular, the lens needs to have a high level of resolution across the entire field of the lens and a high level of chromatic aberration correction.

A high level of resolution is needed because good image quality is required even at the extreme points of the field of view of the lens when viewing data. As will be evident, a clear, undistorted image of a displayed number or letter is just as important at the edge of the field as it is at the center.

A high level of chromatic aberration correction is important because color aberrations can be easily seen in the image of a pixelized panel as a smudging of a pixel or, in extreme cases, the complete dropping of a pixel from the image. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing CRTs a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

High resolution and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of resolution loss or color aberration in the images of such interfaces.

D. Cabinet Size

For rear projection systems, there is an ever increasing demand for smaller cabinet sizes (smaller footprints). In terms of the projection lens, this translates into a requirement that the lens has a wide field of view (FOV) in the direction of the image (screen). The requirement for a large FOV makes it even more difficult to correct the lateral color of the lens.

In addition to a large FOV in the direction of the lens' long conjugate, when used with a large format pixelized panel, the projection lens also needs to have a relatively large FOV in the direction of its short conjugate. However, such short conjugate FOV must not be so large as to compromise the transmission of light through the Fresnel lens typically used on the projection lens side of a transmissive LCD panel.

Achieving wide fields of view in the direction of the lens' long and short conjugates, while still maintaining high levels of aberration correction, is technically challenging. To do so while minimizing the size of the projection lens and the number of optical components used in the lens is even more demanding. As illustrated by the examples presented below, the present invention in its preferred embodiments provides projection lenses which simultaneously satisfy these competing design criteria.

SUMMARY OF THE INVENTION

In accordance with a first aspect, the invention provides a projection lens for forming an enlarged image of a pixelized panel on a screen, said projection lens having a long conjugate side (image or screen side), a short conjugate side (object or pixelized panel side), and an effective focal length $f_0$, said lens, in order from the long conjugate side to the short conjugate side, comprising:

(I) a first lens unit (U1) consisting in order from the long conjugate side to the short conjugate side of:
 (A) a first lens sub-unit (U1S1) having a negative power and comprising a negative lens element (L1) which (i) has a short conjugate surface (S') which is concave towards the short conjugate side and (ii) comprises at least one aspheric surface; and
 (B) a second lens sub-unit (U1S2), which preferably has a positive power;

(II) an aperture stop (AS); and (III) a second lens unit (U2) having a positive power, an effective focal length $f_{U2}$, and consisting in order from the long conjugate side to the short conjugate side of:
 (A) a first lens sub-unit (U2S1) having a positive power, an effective focal length $f_{U2S1}$ and comprising a positive lens element (L3) and a negative lens element (L4), the positive lens element having a lower dispersion than the negative lens element and preferably being located closer to the aperture stop than the negative lens element; and
 (B) a second lens sub-unit (U2S2) which, in order from the long conjugate side to the short conjugate side, comprises:
  a negative lens element ($L_{NEG}$; FIGS. 1, 2, and 3) having a focal length $f_{neg}$ and a lens element ($L_{ASP}$; FIGS. 1, 2, and 3) which comprises an aspherical surface ($S_{ASP}$) which has a positive on-axis power and preferably has:
   (i) a power at the surface's clear aperture whose magnitude is less than the on-axis power (most preferably, the power at the clear aperture, like the on-axis power, is positive), and/or
   (ii) a location in the projection lens which makes it the closest lens surface to the pixelized panel; or
  a lens element ($L_{PN}$; FIG. 4) having first and second optical surfaces ($S_N$ and $S_P$, respectively; FIG. 4), where the first and second surfaces are separated by an axial distance t which satisfies the relationship $t/f_0 \leq 0.05$, the first surface ($S_N$; FIG. 4) has a negative power $\theta_{neg}$, and the second surface ($S_p$; FIG. 4) is an aspherical surface which has a positive on-axis power and preferably has:
   (i) a power at the surface's clear aperture whose magnitude is less than the on-axis power (most preferably, the power at the clear aperture, like the on-axis power, is positive), and/or
   (ii) a location in the projection lens which makes it the closest lens surface to the pixelized panel;

wherein:
(a) the first and second lens units (U1 and U2) are the only lens units of the projection lens;
(b) $f_{U2}/f_0 \leq 1.5$;
(c) $f_{U2S1}/f_0 \leq 2.0$ (preferably, $f_{U2S1}/f_0 \leq 1.5$); and
(d) $|f_{neg}| \leq 2.0 \cdot f_0$ or $1/|\theta_{neg}| \leq 1.5 \cdot f_0$.

In certain preferred embodiments, the first lens sub-unit (U2S1) of the second lens unit (U2) has a lens surface (S") which is closest to the aperture stop (AS) and that lens surface has a positive power. In other preferred embodiments, the positive (L3) and negative (L4) lens elements of the first lens sub-unit (U2S1) of the second lens unit (U2) comprise a cemented doublet.

The projection lens preferably satisfies some and most preferably all of the following relationships:
(1) $FOV_{LC} \geq 80°$ (more preferably: $FOV_{LC} \geq 85°$);
(2) $FOV_{SC} \geq 60°$ (more preferably: $FOV_{SC} \geq 65°$);
(3) $BRL/f_0 \leq 0.9$ (more preferably: $BRL/f_o \leq 0.85$); and/or
(4) $CA_{max}/f_0 \leq 0.8$ (more preferably: $CA_{max}/f_0 \leq 0.75$)
where $FOV_{LC}$ and $FOV_{SC}$ are the full field of views in the directions of the long and short conjugates, respectively, and $CA_{max}$ is the projection lens' maximum clear aperture, i.e., the maximum clear aperture of all of the optical components of the projection lens.

The projection lenses also preferably employ five or less optical components and six or less lens elements. Thus, as illustrated by Examples 1–4 below, the projection lenses can contain five components comprising six lens elements or four components comprising five lens elements.

In accordance with a second aspect, the invention provides a projection lens system which comprises a projection lens in accordance with the first aspect of the invention and a pixelized panel (PP) which, preferably, has a diagonal which is greater than 250 millimeters. In accordance with this aspect, the projection lens system further preferably comprises a Fresnel lens (FL) between the pixelized panel and the projection lens.

The reference symbols used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention, and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification.

DESCRIPTION OF THE PREFERRED EMBODIMENTS

Figure 1:
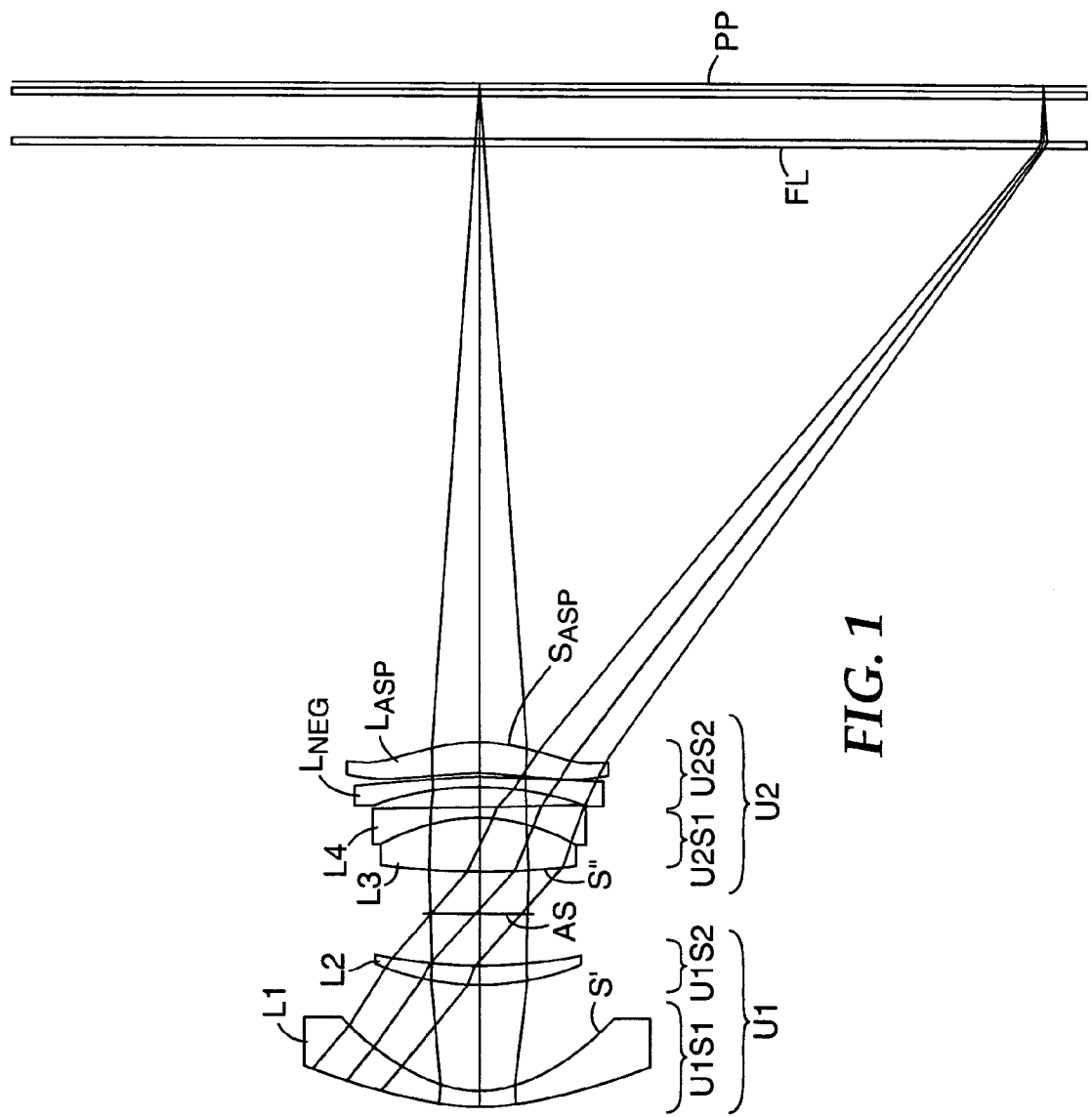
FIGS. 1 through 4 are schematic side views of representative projection lenses constructed in accordance with the invention.

As discussed above, in accordance with certain of its aspects, the present invention provides projection lenses suitable for use in rear projection televisions wherein the imaging device employed in the television is preferably a large format pixelized panel, e.g., a large format transmissive LCD panel.

The first order form of the projection lens is generally that of a retrofocus wide angle imaging lens, with a large field angle in the long conjugate direction, e.g., a field angle of about 88 degrees, and a smaller field angle in the short conjugate direction, e.g., a field angle in the mid 60° range. The lenses can be used with, for example, rear-projection screens that are sized between 42 and 70 inches diagonal, and with LCD imagers of sizes from 10 inch to 15 inch diagonal. Preferably, there is a primary fold mirror between the large screen and the lens, and another fold between the lens and the LCD imager.

Transmissive LCD imagers generally operate with telecentric light on both sides, i.e., on the illumination side and on the screen display side, so preferably there is a Fresnel lens on both sides of the LCD—one for the imaging side and one for the projection lens side. To achieve efficient light transmission through the Fresnel lens located on the screen side of the LCD, the field angle of the projection lens is preferably kept below about 70° in the short conjugate direction. In this way, high loss of light from interference with the risers of the Fresnel lens is avoided.

As discussed in commonly-assigned U.S. patent Application Ser. No. 10/858,785, entitled "Large-Panel Table-Top Rear Projection Television," the contents of which are incorporated herein by reference, rear projection imaging systems employing the projection lenses of the present invention can have cabinet sizes that are more compact than one would expect from the components contained in them. In particular, the projection lenses of the invention contribute to small cabinet sizes by having barrel lengths that preferably are shorter than 40% of the LCD diagonal.

As indicated above, the overall structure of the projection lenses of the invention generally corresponds to that of a retrofocus lens. However, while a classic retrofocus lens has a negative first lens unit, the projection lenses of the present invention can have first lens units which have a weak positive power. In all cases, however, the first lens subunit (U1S1) of the first lens unit (U1) is negative and, preferably, strongly negative. For high resolution and aberration correction, the first lens subunit comprises a negative lens element (e.g., a plastic element) which includes at least one aspheric surface. Preferably, U1S1 contains only a single, negative, plastic asphere. Spaced from the first lens subunit (U1S1) of the first lens unit (U1) is a second lens subunit (U1S2), which preferably has a positive power. Most preferably, U1S2 comprises a single positive lens element.

As in a classic retrofocus lens, the second lens unit (U2) of the projection lenses of the invention has a positive power and, in particular, a strong positive power, i.e., $f_{U2}/f_0 \leq 1.5$.

To achieve an overall compact lens, specifically, a short barrel length, the second lens unit has an internal structure which comprises positive power followed by negative power, i.e., the second lens unit has an optical power distribution like that of a telephoto lens. In particular, the first lens subunit (U2S1) of the second lens unit (U2) has a positive power, while the second lens subunit (U2S2) comprises at least some negative power. This arrangement makes the second lens unit (U2) compact, which, in turn, makes the barrel length of the entire projection lens small.

The first lens subunit (U2S1) of the second lens unit includes a positive lens element and a negative lens element, with the positive lens element having a lower dispersion (higher Abbe number) than the negative lens element, e.g., the positive lens element is made of a crown glass and the negative lens element is made of a flint glass. Typically, these two elements will be in the form of a cemented doublet. To reduce the barrel length of the overall lens, the positive lens element of U2S1 is preferably located closer to the aperture stop than the negative element. This is opposite to the typical orientation of a color correcting (achromatizing) doublet in a retrofocus lens.

The first lens subunit (U2S1) of the second lens unit (U2) has a relatively strong power, i.e., $f_{U2S1}/f_0 \leq 2.0$ and, preferably, $f_{U2S1}/f_0 \leq 1.5$. In particular, the first optical surface (or first lens element) after the aperture stop has a relatively strong positive power, e.g., the surface or lens is strong enough to contribute a substantial amount and, in some cases, almost all of the power of the entire lens.

As indicated above, the second lens subunit (U2S2) of the second lens unit (U2) comprises at least some negative power so that the second lens unit as a whole generally has a telephoto-type (positive-negative) construction. Internally, U2S2 employs a retrofocus-type construction, i.e., negative power followed by positive power.

In certain embodiments (see, for example, FIGS. 1–3), the retrofocus-type structure is achieved through two separate lens elements, i.e., a negative lens element ($L_{NEG}$) followed by a lens element ($L_{ASP}$) which has an aspheric surface which has a positive on-axis power. In other embodiments (see, for example, FIG. 4), the negative-positive construction is achieved using a single, relatively thick lens element (i.e., $t/f_0 \geq 0.05$) having a long conjugate surface ($S_N$) with a negative power and a short conjugate aspheric surface ($S_P$) with a positive on-axis power. In either case, the negative power used in U2S2 is relatively strong, with the focal length ($f_{neg}$) of the negative lens element for embodiments employing two lens elements satisfying the relationship:

$|f_{neg}| \leq 2.00 \cdot f_0$, and the power ($\theta_{neg}$) of the negative surface ($S_N$) for embodiments employing a single lens element satisfying the relationship:

$1/|\theta_{neg}| \leq 1.5 \cdot f_0$.

Like the aspheric element used in the first lens subunit (U1S1) of the first lens unit (U1), the aspheric surface used in U2S2 (e.g., the aspheric surface of $L_{ASP}$ in FIGS. 1–3 and $S_P$ in FIG. 4) serves to provide the projection lens with high resolution and aberration correction. In particular, the surface provides correction for coma and distortion. Typically, the surface is quite strongly positive for on axis rays, but becomes weaker positive for points at the extreme field.

From the foregoing, it can be seen that the projection lenses of the invention preferably have an overall structure which can be described as a negative (or weakly positive) unit followed by a positive unit, with the positive unit having a positive subunit followed by a subunit with negative power, with the subunit with negative power having an internal structure where negative power is followed by positive power. In this way, an overall short projection lens (e.g., $BRL/f_0 \leq 0.9$) along with small lens elements (e.g., $CA_{max}/f_0 \leq 0.8$) can be achieved.

Particularly preferred applications for the projection lenses of the invention are in connection with high resolution LCD panels that have as many as 1080 pixels across the vertical and have separate red-green-blue subpixels. For example, for a panel having a 15 inch (380 mm) diagonal, the pixels are 170 microns across and the subpixels are only 58 microns across. This gives a resolution requirement of ~3000 pixels, with resolution frequencies as high as 8 line pairs/mm. The lenses of the invention readily achieve aberration correction levels sufficient for these resolutions.

Without intending to limit it in any manner, the present invention will be more fully described by the following examples.

EXAMPLES

Figure 2:
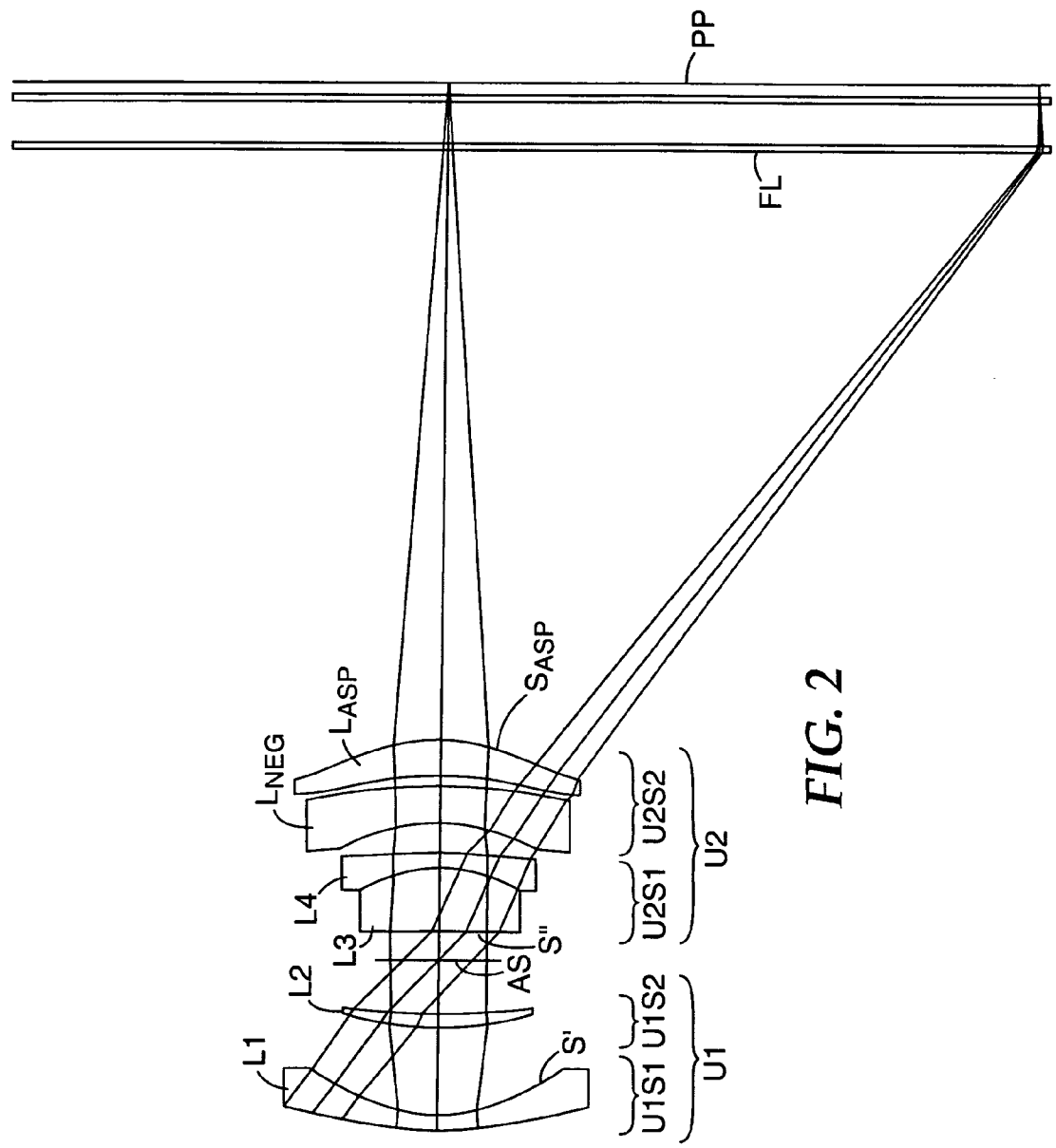
Figure 3:
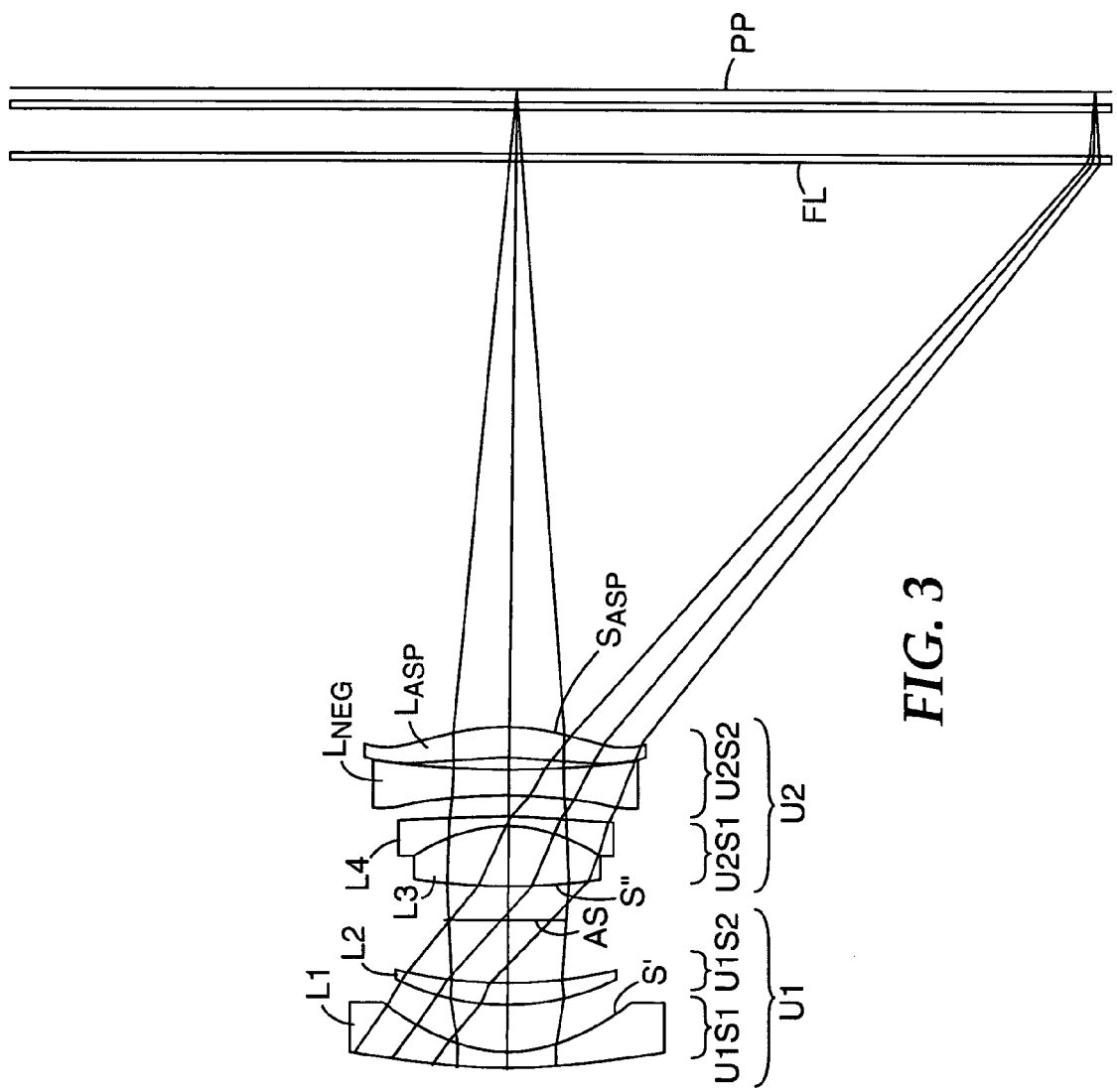
Figure 4:
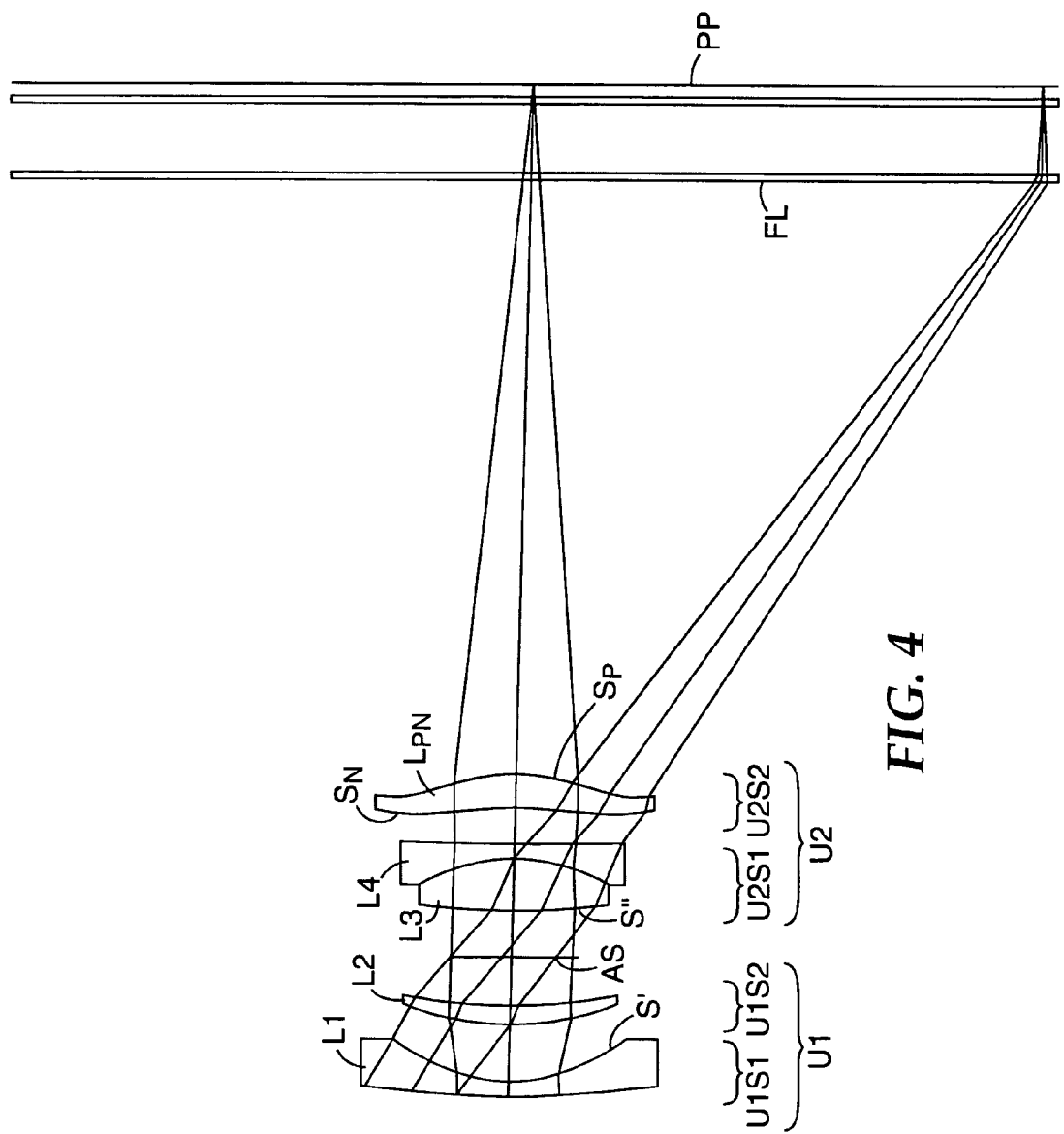
Figure 5:
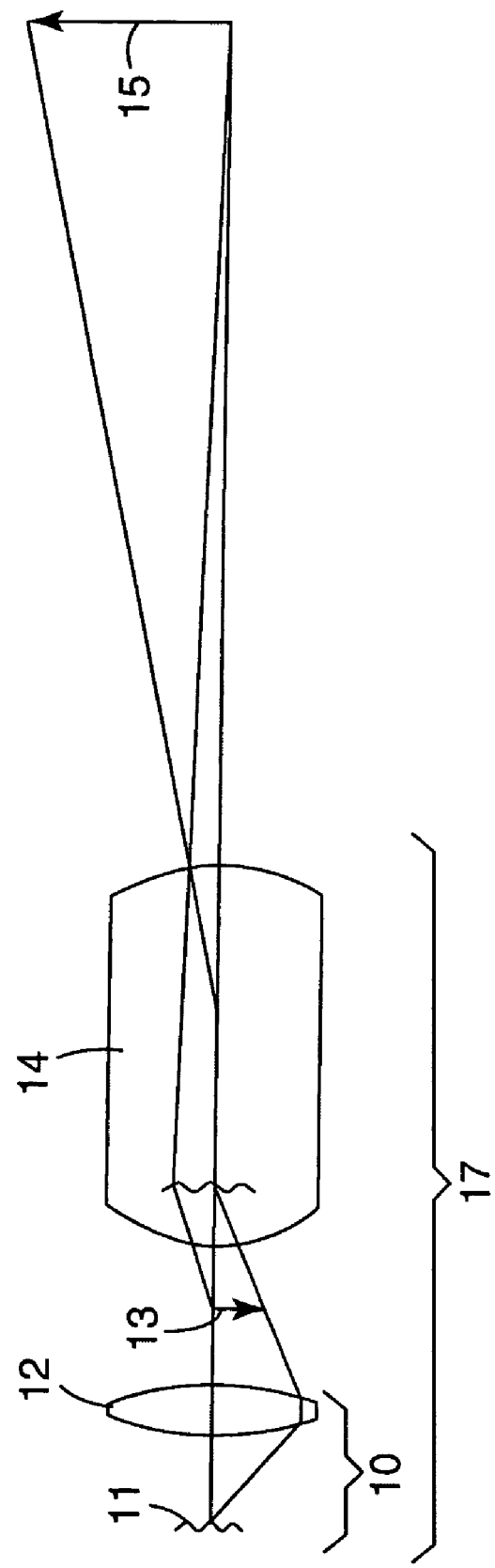
FIG. 5 is a schematic diagram showing an overall projection lens system in which the projection lenses of the present invention can be used.

FIGS. 1–4 and Tables 1–4 illustrate representative projection lenses constructed in accordance with the invention. The lenses of Examples 1 and 2 were designed for use with pixelized panels having diagonals of 15 inches (380 mm), while those of Examples 3 and 4 were designed for panel diagonals of 13 inches (330 mm) and 10 inches (250 mm), respectively. FIG. 1 is drawn based on the prescription of Table 1A. Table 1B shows a variation of this prescription which has a somewhat larger space between U2S1 and U2S2 to facilitate assembly of the lens. Although not identical to the prescription of Table 1B, FIG. 1 shows the general structure of the lens of this table.

OHARA designations are used in the prescriptions of Tables 1–4 for the various glasses employed in the lens systems. Equivalent glasses made by other manufacturers (e.g., HOYA or SCHOTT) can be used in the practice of the invention. Industry acceptable materials are used for the plastic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant.

The various structures located on the short conjugate side of U2 in the figures and tables represent components (e.g., Fresnel lens, polarizer, cover glass) which are used with or are a part of the pixelized panel. They do not constitute part of the projection lens. All dimensions given in Tables 1–4 are in millimeters except where other units are indicated.

The prescription tables are constructed on the assumption that light travels from left to right in the figures. In actual practice, the viewing screen will be on the left and the pixelized panel will be on the right, and light will travel from right to left. In particular, the references in the prescription tables to objects/images and entrance/exit pupils are reversed from that used in the rest of the specification. The pixelized panel is shown in the FIGS. 1–4 by the designation "PP" and the aperture stop is shown by the designation "AS".

Tables 5 and 6 summarize various of the properties of the projection lenses of Examples 1–4. In particular, Table 5 sets forth the $f_{U2}/f_0$, $f_{U2S1}/f_0$, and $|f_{neg}|/f_0$ or, in the case of Example 4, the $1/(|\theta_{neg}| \cdot f_0)$ values for these examples, as well as their $FOV_{LC}$ and $FOV_{SC}$ values. As shown in this table, $f_{U2}/f_0$ is less than 1.5 in all cases, $f_{U2S1}/f_0$ is less than 2.0, and the $|f_{neg}|/f_0$ or $1/(|\theta_{neg}| \cdot f_0)$ values are less than 2.0 and 1.5, respectively. Also, the $FOV_{LC}$ and $FOV_{SC}$ values are greater than 80° and 60°, respectively.

Table 6 sets forth the $BRL/f_0$ and $CA_{max}/f_0$ values for these examples. As shown therein, the $BRL/f_0$ values are all less than 0.85 and the $CA_{max}/f_0$ are all less than 0.75. As discussed above, the lenses of Examples 1 and 2 were designed for use with pixelized panels having diagonals of 15 inches (380 mm), while those of Examples 3 and 4 were designed for panel diagonals of 13 inches (330 mm) and 10 inches (250 mm), respectively. These diagonal values can also be used as a measure of the compactness of the projection lenses of the invention. The last two rows of Table 6 set forth $BRL/D_{PP}$ and $CA_{max}/D_{PP}$ values for Examples 1–4, where $D_{PP}$ is the diagonal length in millimeters, i.e., 380 mm for Examples 1 and 2, 330 mm for Example 3, and 250 mm for Example 4. As can be seen, the $BRL/D_{PP}$ values are all less than 0.4, and the $CA_{max}/D_{PP}$ values are all less than 0.35.

As illustrated by these examples, the projection lenses of the invention are well-suited to the manufacture of compact, light weight, projection televisions and monitors which employ pixelized panels.

Although specific embodiments of the invention have been described and illustrated, it is to be understood that a variety of modifications which do not depart from the scope and spirit of the invention will be evident to persons of ordinary skill in the art from the foregoing disclosure.

TABLE 1A

Lens Prescription

| Surf | Radius | Thickness | Glass | Diameter | Type |
|---|---|---|---|---|---|
| Object | Infinity | 755.645 | | 1584 | |
| R1 | 61.1886 | 6.500 | ACRYLIC | 120 | Plastic Asph. |
| R2 | 34.7014 | 40.700 | | 94 | Plastic Asph. |
| R3 | 81.7806 | 7.500 | S-LAH60 | 72 | |
| R4 | 141.0022 | 20.000 | | 72 | |
| Stop | Infinity | 15.850 | | 38 | |
| R5 | 200 | 21.000 | S-LAL18 | 68 | |
| R6 | −61.9734 | 4.000 | SF2 | 68 | |
| R7 | 1439.0090 | 7.666 | | 74 | |
| R8 | −98.7976 | 4.500 | S-TIL6 | 76 | |
| R9 | −364.3930 | 1.000 | | 86 | |
| R10 | −166.9567 | 12.000 | ACRYLIC | 86 | Plastic Asph. |
| R11 | −67.8402 | 226.119 | | 92 | Plastic Asph. |
| Fresnel | Infinity | 2.400 | PMMA | 420 | |
| Fresnel | −139.8134 | 17.000 | | 420 | Fresnel Asph. |
| Coverglass | Infinity | 1.700 | BK7 | 420 | |
| | Infinity | 2.400 | | 420 | |
| LCD/image | Infinity | | | 420 | |

Even Polynomial Aspheres

| Surf | k | D | E | F |
|---|---|---|---|---|
| 1 | −9.652975 | 1.65914E−07 | 6.99128E−12 | −8.40763E−16 |
| 2 | −3.510827 | 2.99206E−06 | −1.05738E−09 | 3.98975E−13 |
| 10 | 1.234806 | 2.87799E−07 | 7.15829E−10 | 4.89699E−14 |
| 11 | −1.276786 | 3.11936E−07 | 2.50748E−10 | 4.88367E−13 |
| Fresnel | −1.956548 | −4.78575E−08 | 2.22198E−12 | −1.33168E−16 |

| Surf | G | H | I |
|---|---|---|---|
| 1 | −5.93220E−19 | 0.00000E+00 | |
| 2 | −4.78825E−17 | −4.31913E−21 | |
| 10 | −1.62473E−17 | −1.38044E−20 | |
| 11 | −7.89197E−17 | −2.02647E−20 | |
| Fresnel | 4.26516E−21 | −6.29319E−26 | 3.30111E−31 |

First Order Properties of Elements:

| Element # | Surface #'s | EFL |
|---|---|---|
| 1 | R1–R2 | −177.0 |
| 2 | R3–R4 | 219.5 |
| *3 | R5–R6 | 66.9 |
| *4 | R6–R7 | −91.11 |
| 5 | R8–R9 | −254.7 |
| 6 | R10–R11 | 223.0 |

Doublet Properties

| Element #s | Surface #'s | EFL |
|---|---|---|
| 3–4 | R5–R7 | 224.1 |

Group EFL Properties

| Element #'s | Surface #'s | EFL |
|---|---|---|
| Total w/o fresnel | R1–R11 | 182.5 |
| 1–2 | R1–R4 | −2916.0 |
| 3–6 | R5–R11 | 204.0 |

First Order Data:

| | |
|---|---|
| F/Number | 7.0 |
| Magnification | 4.06 |
| Object Height | 792.0 |
| Object Distance | |
| Image Height | 195.00 |
| Effective Focal Length (EFL) | 201.20 |
| EFL without Fresnel | 182.50 |
| Barrel Length (BRL) | 140.7 |
| Front Vertex Distance (FVD) | 390.2 |
| Entrance Pupil Distance | 83.0 |
| Exit Pupil Distance | 11000.0 |

TABLE 1A-continued

| | |
|---|---|
| Stop Diameter | 28.7 |
| Field Angle (semi-diag; degrees; long conjugate) | 44.30 |
| Field Angle (semi-diag; degrees; short conjugate) | 34.7 |

*note: separate elements of doublet are given as if each were in air

TABLE 1B

Lens Prescription

| Surf | Radius | Thickness | Glass | Diameter | Type |
|---|---|---|---|---|---|
| Object | Infinity | 741.35 | | 1584 | |
| R1 | 68.259 | 7.00 | ACRYLIC | 120 | Plastic Asph. |
| R2 | 36.938 | 32.61 | | 94 | Plastic Asph. |
| R3 | 193.131 | 6.00 | S-TIH14 | 72 | |
| R4 | 594.370 | 23.87 | | 72 | |
| Stop | Infinity | 9.63 | | 38 | |
| R5 | 250.000 | 24.00 | S-LAL18 | 68 | |
| R6 | −46.513 | 3.50 | S-FTM16 | 68 | |
| R7 | −464.000 | 19.06 | | 74 | |
| R8 | −324.473 | 3.50 | S-TIL6 | 76 | |
| R9 | 324.473 | 4.74 | | 86 | |
| R10 | −149.557 | 7.26 | ACRYLIC | 86 | Plastic Asph. |
| R11 | −78.406 | 212.22 | | 92 | Plastic Asph. |
| Fresnel | Infinity | 2.40 | PMMA | 420 | |
| Fresnel | −139.955 | 12.00 | | 420 | Fresnel Asph. |
| Coverglass | Infinity | 1.70 | BK7 | 420 | |
| | Infinity | 2.40 | | 420 | |
| LCD/image | Infinity | | | 420 | |

Even Polynomial Aspheres

| Surf | k | D | E | F |
|---|---|---|---|---|
| 1 | −4.590606 | −7.64064E−08 | −1.92073E−12 | 7.04605E−15 |
| 2 | −2.470352 | 3.07379E−06 | −1.05632E−09 | 4.48346E−13 |
| 10 | −4.135202 | 4.59146E−07 | 5.19531E−10 | 4.47263E−14 |
| 11 | −2.442999 | 4.71005E−07 | 2.63157E−10 | 4.74425E−13 |
| Fresnel | −0.5219711 | −1.78610E−09 | 1.95804E−12 | −9.02750E−17 |

| Surf | G | H | I |
|---|---|---|---|
| 1 | −2.42321E−18 | | |
| 2 | −2.99183E−17 | −2.22559E−20 | |
| 10 | 3.42868E−17 | −4.14616E−20 | |
| 11 | −1.15771E−16 | −2.26009E−20 | |
| Fresnel | 3.88480E−21 | −1.03493E−25 | 1.34282E−30 |

First Order Properties of Elements:

| Element # | Surface #'s | EFL |
|---|---|---|
| 1 | R1–R2 | −176.0 |
| 2 | R3–R4 | 369.8 |
| *3 | R5–R6 | 55.52 |
| *4 | R6–R7 | −86.91 |
| 5 | R8–R9 | −302.50 |
| 6 | R10–R11 | 322.84 |

Doublet Properties

| Element #'s | Surface #'s | EFL |
|---|---|---|
| 3–4 | R5–R7 | 235.13 |

Group EFL Properties

| Element #'s | Surface #'s | EFL |
|---|---|---|
| Total w/o fresnel | R1–R11 | 172.16 |
| 1–2 | R1–R4 | −385.67 |
| 3–6 | R5–R11 | 152.77 |

TABLE 1B-continued

First Order Data:

| | |
|---|---|
| F/Number | 7.0 |
| Magnification | 4.06 |
| Object Height | 792.0 |
| Object Distance | 741.35 |
| Image Height | 195.00 |
| Effective Focal Length (EFL) | 190.62 |
| EFL without Fresnel | 172.16 |
| Barrel Length (BRL) | 141.17 |
| Front Vertex Distance (FVD) | 372.01 |
| Entrance Pupil Distance | 65.05 |
| Exit Pupil Distance | −22307 |
| Stop Diameter | 27.23 |
| Field Angle (semi-diag; degrees; long conjugate) | 44.89 |
| Field Angle (semi-diag; degrees; short conjugate) | 35.72 |

*note: separate elements of doublet are given as if each were in air

TABLE 2

Lens Prescription

| Surf | Radius | Thickness | Glass | Diameter | Type |
|---|---|---|---|---|---|
| Object | Infinity | 774.450 | | 1,584 | |
| R1 | 63.20524 | 5.100 | ACRYLIC | 100 | Plastic asphere |
| R2 | 37.20784 | 32.632 | | 84 | Plastic asphere |
| R3 | 95.93437 | 5.500 | S-LAH60 | 62 | |
| R4 | 251.52000 | 19.681 | | 56 | |
| Stop | Infinity | 10.429 | | 40 | |
| R5 | 979.75220 | 23.500 | S-LAL18 | 52 | |
| R6 | −44.88326 | 5.700 | SF2 | 52 | |
| R7 | −235.64470 | 10.857 | | 64 | |
| R8 | −64.30484 | 13.500 | S-TIL6 | 68 | |
| R9 | −167.20560 | 4.000 | | 86 | |
| R10 | −94.85293 | 13.000 | ACRYLIC | 88 | Plastic asphere |
| R11 | −56.846052 | 13.000 | | 94 | Plastic asphere |
| Fresnel | Infinity | 2.400 | PMMA | 392 | |
| Fresnel | −152.00770 | 16.000 | | 394 | Fresnel Asph |
| Coverglass | Infinity | 1.700 | BK7 | 391 | |
| LCD/image | Infinity | 2.400 | | 391 | |

Even Polynomial Aspheres

| Surf | k | D | E | F |
|---|---|---|---|---|
| 1 | −18.36055 | 0 | | |
| 2 | −5.93669 | 3.02566E−06 | −1.56956E−09 | 5.84265E−13 |
| 10 | 1.62343 | −2.02186E−07 | 1.05660E−09 | −8.30212E−14 |
| 11 | −0.69378 | −9.81953E−08 | 9.50250E−11 | 4.10160E−13 |
| Fresnel | −0.46094 | −1.05868E−08 | 1.80232E−12 | −1.55126E−17 |

| Surf | G | H |
|---|---|---|
| 1 | | |
| 2 | −9.93927E−17 | 3.99940E−21 |
| 10 | 9.48857E−18 | −4.85877E−21 |
| 11 | −4.94773E−17 | −1.01177E−20 |
| Fresnel | −1.21963E−21 | 3.17137E−26 |

First Order Properties of Elements:

| Element # | Surface #'s | EFL |
|---|---|---|
| 1 | R1–R2 | −197.1 |
| 2 | R3–R4 | 183.2 |
| *3 | R5–R6 | 59.5 |
| *4 | R6–R7 | −86.7 |
| 5 | R8–R9 | −205.5 |
| 6 | R9–R10 | 259.9 |

Doublet Properties

| Element #'s | Surface #'s | EFL |
|---|---|---|
| 3–4 | R5–R7 | 191.2 |

TABLE 2-continued

Group EFL Properties

| Element #'s | Surface #'s | EFL |
|---|---|---|
| Total w/o fresnel | R1–R11 | 184.3 |
| 1–2 | R1–R4 | 914.3 |
| 3–6 | R5–R11 | 239.7 |

First Order Data:

| | |
|---|---|
| F/Number | 7.0 |
| Magnification | 4.06 |
| Object Height | 792.0 |
| Object Distance | 774.5 |
| Image Height | 195.00 |
| Effective Focal Length (EFL) | 202.60 |
| EFL without Fresnel | 184.30 |
| Barrel Length (BRL) | 143.9 |
| Front Vertex Distance (FVD) | 380.1 |
| Entrance Pupil Distance | 95.6 |
| Exit Pupil Distance | −8500.0 |
| Stop Diameter | 28.9 |
| Field Angle (semi-diag; degrees; long conjugate) | 43.90 |
| Field Angle (semi-diag; degrees; short conjugate) | 34.6 |

*note: separate elements of doublet are given as if each were in air

TABLE 3

Lens Prescription

| Surf | Radius | Thickness | Glass | Diameter | Type |
|---|---|---|---|---|---|
| Object | Infinity | 646.850 | | 1,320.0 | |
| R1 | 101.015 | 5.000 | ACRYLIC | 83.5 | Plastic asphere |
| R2 | 38.212 | 16.292 | | 66.2 | Plastic asphere |
| R3 | 62.137 | 6.728 | S-LAH60 | 57.5 | |
| R4 | 100.042 | 19.767 | | 53.8 | |
| Stop | Infinity | 10.756 | | 32.2 | |
| R5 | 151.173 | 19.000 | S-LAL18 | 50.6 | |
| R6 | −45.686 | 3.100 | SF2 | 52.0 | |
| R7 | −218.093 | 7.042 | | 61.5 | |
| R8 | −117.756 | 9.000 | S-TIL6 | 65.3 | |
| R9 | 252.375 | 3.300 | | 76.7 | |
| R10 | −150.159 | 8.859 | ACRYLIC | 78.2 | Plastic asphere |
| R11 | −64.728 | 180.319 | | 80.4 | Plastic asphere |
| Fresnel | Infinity | 2.000 | PMMA | 337.1 | |
| Fresnel | Infinity | 14.000 | | 338.7 | Fresnel |
| Coverglass | Infinity | 1.500 | BK7 | 337.7 | |
| LCD/image | Infinity | 2.000 | | 337.8 | |

Even Polynomial Aspheres

| Surf | k | D | E | F |
|---|---|---|---|---|
| 1 | −8.85430 | | | |
| 2 | −3.32606 | 5.51778E−06 | −2.56717E−09 | 1.25125E−12 |
| 10 | −21.02927 | 3.57810E−07 | 9.19490E−10 | 5.30768E−13 |
| 11 | −1.84682 | 8.85209E−07 | 3.49187E−10 | 1.04980E−12 |
| Fresnel | −4.28842E−03 | −5.35737E−09 | −1.24206E−12 | 1.07348E−16 |

| Surf | G | H |
|---|---|---|
| 1 | | |
| 2 | −1.53214E−16 | |
| 10 | −6.60324E−17 | −1.31481E−19 |
| 11 | 9.44401E−17 | −2.43104E−19 |
| Fresnel | −3.85673E−21 | 4.96338E−26 |

TABLE 3-continued

First Order Properties of Elements:

| Element # | Surface #'s | EFL |
|---|---|---|
| 1 | R1–R2 | −125.2 |
| 2 | R3–R4 | 141.6 |
| *3 | R5–R6 | 50.0 |
| *4 | R6–R7 | −89.3 |
| 5 | R8–R9 | −132.8 |
| 6 | R10–R11 | 179.4 |

Doublet Properties

| Element # | Surface #'s | EFL |
|---|---|---|
| 3–4 | R5–R7 | 127.5 |

Group EFL Properties

| Element # | Surface #'s | EFL |
|---|---|---|
| Total w/o fresnel | R1–R11 | 156.4 |
| 1–2 | R1–R4 | −3829.0 |
| 3–6 | R5–R11 | 166.7 |

First Order Data:

| | |
|---|---|
| F/Number | 6.0 |
| Magnification | 3.93 |
| Object Height | 660.0 |
| Object Distance | 646.8 |
| Image Height | 168.00 |
| Effective Focal Length (EFL) | 174.47 |
| EFL without Fresnel | 156.40 |
| Barrel Length (BRL) | 110.4 |
| Front Vertex Distance (FVD) | 306.5 |
| Entrance Pupil Distance | 84.2 |
| Exit Pupil Distance | 56000.0 |
| Stop Diameter | 21.8 |
| Field Angle (semi-diag; degrees; long conjugate) | 44.00 |
| Field Angle (semi-diag; degrees; short conjugate) | 36.6 |

*note: separate elements of doublet are given as if each were in air

TABLE 4

Lens Prescription

| Surf | Radius | Thickness | Glass | Diameter | Type |
|---|---|---|---|---|---|
| OBJ | Infinity | 688.803 | | 1,300.0 | |
| R1 | 249.119 | 6.000 | ACRYLIC | 70.0 | Plastic asphere |
| R2 | 42.073 | 15.001 | | 54.0 | Plastic asphere |
| R3 | 61.917 | 3.646 | S-LAH60 | 46.1 | |
| R4 | 141.092 | 12.183 | | 45.1 | |
| STO | Infinity | 11.218 | | 26.0 | |
| R5 | 72.675 | 16.000 | S-PHM53 | 52.0 | |
| R6 | −41.905 | 2.500 | BPH5 | 52.0 | |
| R7 | 254.366 | 6.688 | | 52.0 | |
| R8 | −48.272 | 13.225 | ACRYLIC | 58.2 | Plastic asphere |
| R9 | −39.553 | 153.485 | | 65.6 | Plastic asphere |
| Fresnel | Infinity | 2.000 | PMMA | 262.4 | |
| — | Infinity | 10.000 | | 263.9 | |
| Cvrglss/polzr | Infinity | 3.000 | BK7 | 262.5 | |
| — | Infinity | 0.768 | | 262.2 | |
| LCD/image | | | | 260.1 | |

Even Polynomial Aspheres

| Surf | k | D | E | F |
|---|---|---|---|---|
| 1 | 0.000000 | 4.88590E−07 | −1.29138E−09 | 9.50012E−13 |
| 2 | −4.852427 | 8.58791E−06 | −8.95905E−09 | 7.58528E−12 |
| 8 | −12.100460 | −1.11633E−05 | 2.09397E−08 | −8.82767E−12 |
| 9 | −0.632851 | 1.89526E−06 | −1.21100E−09 | 1.07489E−11 |
| Fresnel | −4.95310E−03 | 1.72947E−08 | −5.87066E−12 | 5.21696E−16 |

TABLE 4-continued

| Surf | G | H |
|---|---|---|
| 1 | −2.91143E−16 | |
| 2 | −3.47633E−15 | |
| 8 | −5.79639E−16 | |
| 9 | −5.52470E−15 | |
| Fresnel | −2.27597E−20 | 3.86315E−25 |

First Order Properties of Elements:

| Element # | Surface #'s | EFL |
|---|---|---|
| 1 | R1–R2 | −103.7 |
| 2 | R3–R4 | 128.9 |
| *3 | R5–R6 | 42.7 |
| *4 | R6–R7 | −42.8 |
| *5a - R8 one side only | R8 | −98.0 |
| *5b - R9 one side only | R9 | 80.3 |
| *5 | R8–R9 | 296.1 |

Doublet Properties

| Element # | Surface #'s | EFL |
|---|---|---|
| 3–4 | R5–R7 | 206.4 |

Group EFL Properties

| Element # | Surface #'s | EFL |
|---|---|---|
| Total w/o fresnel | R1–R9 | 133.0 |
| 1–2 | R1–R4 | −1070.0 |
| 3–5 | R5–R9 | 137.7 |

First Order Data:

| | |
|---|---|
| F/Number | 6.0 |
| Magnification | 5.00 |
| Object Height | 650.0 |
| Object Distance | 688.8 |
| Image Height | 130.00 |
| Effective Focal Length (EFL) | 143.80 |
| EFL without Fresnel | 132.90 |
| Barrel Length (BRL) | 86.4 |
| Front-Vertex Distance (FVD) | 258.7 |
| Entrance Pupil Distance | 108.4 |
| Exit Pupil Distance | 9600.0 |
| Stop Diameter | 24.0 |
| Field Angle (semi-diag; degrees; long conjugate) | 42.25 |
| Field Angle (semi-diag; degrees; short conjugate) | 30.9 |

*note: separate elements of doublet are given as if each were in air and thick element 5 has each surface focal length listed individually.

TABLE 5*

| | Example 1A | Example 1B | Example 2 | Example 3 | Example 4 |
|---|---|---|---|---|---|
| $f_{U2}/f_0$ | 1.12 | 0.89 | 1.30 | 1.07 | 1.04 |
| $f_{U2S1}/f_0$ | 1.23 | 1.37 | 1.04 | 0.82 | 1.55 |
| $|f_{neg}|/f_0$ | 1.40 | 1.76 | 1.12 | 0.85 | — |
| $1/(|\phi_{neg}| \cdot f_0)$ | — | — | — | — | 0.74 |
| $FOV_{LC}$ | 88.6° | 89.8° | 87.8° | 88.0° | 84.5° |
| $FOV_{SC}$ | 69.4° | 71.4° | 69.2° | 73.2° | 61.8° |

*$f_0$ is without Fresnel

TABLE 6*

| | Example 1A | Example 1B | Example 2 | Example 3 | Example 4 |
|---|---|---|---|---|---|
| $BRL/f_0$ | 0.77 | 0.82 | 0.78 | 0.71 | 0.65 |
| $CA_{max}/f_0$ | 0.66 | 0.70 | 0.54 | 0.53 | 0.53 |
| $BRL/D_{PP}$ | 0.37 | 0.37 | 0.38 | 0.33 | 0.35 |
| $CA_{max}/D_{PP}$ | 0.32 | 0.32 | 0.26 | 0.25 | 0.28 |

*$f_0$ is without Fresnel

What is claimed is:

1. A projection lens for forming an enlarged image of a pixelized panel on a screen, said projection lens having a long conjugate side, a short conjugate side, and an effective focal length $f_0$, said lens, in order from the long conjugate side to the short conjugate side, comprising:
   (I) a first lens unit consisting in order from the long conjugate side to the short conjugate side of:
      (A) a first lens sub-unit having a negative power and comprising a negative lens element which (i) has a short conjugate surface which is concave towards the short conjugate side and (ii) comprises at least one aspheric surface; and
(B) a second lens sub-unit;
(II) an aperture stop; and
(III) a second lens unit having a positive power, an effective focal length $f_{U2}$, and consisting in order from the long conjugate side to the short conjugate side of:
(A) a first lens sub-unit having a positive power, an effective focal length $f_{U2S1}$ and comprising a positive lens element and a negative lens element, the positive lens element having a lower dispersion than the negative lens element; and
(B) a second lens sub-unit which, in order from the long conjugate side to the short conjugate side, comprises:
a negative lens element having a focal length $f_{neg}$ and a lens element which comprises an aspherical surface which has a positive on-axis power; or
a lens element having first and second optical surfaces,—where the first surface has a negative power $\theta_{neg}$, the second surface is an aspherical surface which has a positive on-axis power, and the first and second surfaces are separated by an axial distance t which satisfies the relationship:

$t/f_0 \geq 0.05$;

wherein:
(a) the first and second lens units are the only lens units of the projection lens;
(b) $f_{U2}/f_0 \leq 1.5$;
(c) $f_{U2S1}/f_0 \leq 2.0$; and
(d) $|f_{neg}| \leq 2.0 \cdot f_0$ or $1/|\theta_{neg}| \leq 1.5 \cdot f_0$.

2. The projection lens of claim 1 where the second lens sub-unit of the first lens unit has a positive power.

3. The projection lens of claim 1 where the first lens sub-unit of the second lens unit has a lens surface which is closest to the aperture stop and that lens surface has a positive power.

4. The projection lens of claim 1 where in the first lens sub-unit of the second lens unit, the positive lens element is closer to the aperture stop than the negative lens element.

5. The projection lens of claim 1 where in the first lens sub-unit of the second lens unit, the positive lens element and the negative lens element comprise a cemented doublet.

6. The projection lens of claim 1 where in the second lens sub-unit of the second lens unit, the aspherical surface which has a positive on-axis power has a clear aperture and a power at the clear aperture whose magnitude is less than the on-axis power.

7. The projection lens of claim 6 wherein the power at the clear aperture is positive.

8. The projection lens of claim 1 where the second lens sub-unit of the second lens unit has a lens surface which is closest to the pixelized panel and the aspherical surface which has a positive on-axis power is that closest surface.

9. The projection lens of claim 1 where the lens has a full field of view in the direction of the long conjugate which is greater than or equal to 80 degrees.

10. The projection lens of claim 1 where the lens has a full field of view in the direction of the long conjugate which is greater than or equal to 85 degrees.

11. The projection lens of claim 1 wherein the lens has a full field of view in the direction of the short conjugate which is greater than or equal to 60 degrees.

12. The projection lens of claim 1 wherein the lens has a full field of view in the direction of the short conjugate which is greater than or equal to 65 degrees.

13. The projection lens of claim 1 where the lens has a barrel length BRL which satisfies the relationship:

$BRL/f_0 \leq 0.9$.

14. The projection lens of claim 1 where the lens has a barrel length BRL which satisfies the relationship:

$BRL/f_0 \leq 0.85$.

15. The projection lens of claim 1 where the lens has a maximum clear aperture $CA_{max}$ which satisfies the relationship:

$CA_{max}/f_0 \leq 0.8$.

16. The projection lens of claim 1 where the lens has a maximum clear aperture $CA_{max}$ which satisfies the relationship:

$CA_{max}/f_0 \leq 0.75$.

17. A projection lens system comprising:
(a) a pixelized panel; and
(b) the projection lens of claim 1.

18. The projection lens system of claim 17 where the pixelized panel has a diagonal which is greater than 250 millimeters.

19. The projection lens system of claim 17 further comprising a Fresnel lens between the pixelized panel and the projection lens.

20. The projection lens system of claim 17 further comprising an illumination system which comprises a light source and illumination optics which transfers some of the light from the light source towards the pixelized panel and the projection lens.

21. A projection lens for forming an enlarged image of a pixelized panel on a screen, said projection lens having a long conjugate side, a short conjugate side, and an effective focal length $f_0$, said lens, in order from the long conjugate side to the short conjugate side, comprising:
(I) a first lens unit consisting in order from the long conjugate side to the short conjugate side of:
(A) a negative lens element which (i) has a short conjugate surface which is concave towards the short conjugate side and (ii) comprises at least one aspheric surface; and
(B) a positive lens element;
(II) an aperture stop; and
(III) a second lens unit having a positive power, an effective focal length $f_{U2}$, and consisting in order from the long conjugate side to the short conjugate side of:
(A) a first lens sub-unit having a positive power, an effective focal length $f_{U2S1}$ and consisting in order from the long conjugate side to the short conjugate side of a positive lens element and a negative lens element which form a cemented doublet, the positive lens element having a lower dispersion than the negative lens element; and
(B) a second lens sub-unit which, in order from the long conjugate side to the short conjugate side, consists of:
a negative lens element having a focal length $f_{neg}$ and a lens element which comprises an aspherical surface which has a positive on-axis power; or a lens element having first and second optical surfaces, where the first surface has a negative power $\theta_{neg}$, the second surface is an aspherical surface which has a positive on-axis power, and the first and second surfaces are separated by an axial distance t which satisfies the relationship:

$t/f_0 \geq 0.05$;

wherein:
(a) the first and second lens units are the only lens units of the projection lens;
(b) $f_{U2}/f_0 \leq 1.5$;
(c) $f_{U2S1}/f_0 \leq 2.0$; and
(d) $|f_{neg}| \leq 2.0 \cdot f_0$ or $1/|\theta_{neg}| \leq 1.5 \cdot f_0$.

22. A projection lens system comprising:
(a) a pixelized panel; and
(b) the projection lens of claim 21.

23. The projection lens system of claim 22 further comprising a Fresnel lens between the pixelized panel and the projection lens.

24. The projection lens system of claim 22 further comprising an illumination system which comprises a light source and illumination optics which transfers some of the light from the light source towards the pixelized panel and the projection lens.

* * * * *

UNITED STATES PATENT AND TRADEMARK OFFICE
CERTIFICATE OF CORRECTION

PATENT NO. : 7,009,777 B2
APPLICATION NO. : 10/858786
DATED : March 7, 2006
INVENTOR(S) : Cannon, Bruce L.

It is certified that error appears in the above-identified patent and that said Letters Patent is hereby corrected as shown below:

Title page,
Item [56], References Cited, U.S. PATENT DOCUMENTS, delete "Mort" and insert -- Mori --.

Column 1,
Line 20, after "Component" delete ".".
Line 44, delete "$\theta$" and insert -- $\Phi$ --.

Column 4,
Lines 29 and 55, delete "$\leq$" and insert -- $\geq$ --.
Lines 30 and 44, delete "$\theta$" and insert -- $\Phi$ --.

Column 7,
Line 9, delete "2.00" and insert -- 2.0 --.
Lines 10, 14 and 35, delete "$\theta$" and insert -- $\Phi$ --.

Column 8,
Line 38, delete "$\theta$" and insert -- $\Phi$ --.

Column 9,
Line 42, below "Doublet Properties" delete "Element #s" and insert -- Element #'s --.

Column 21,
Lines 22 and 24, delete "$\theta$" and insert -- $\Phi$ --.

UNITED STATES PATENT AND TRADEMARK OFFICE
CERTIFICATE OF CORRECTION

PATENT NO.       : 7,009,777 B2
APPLICATION NO.  : 10/858786
DATED            : March 7, 2006
INVENTOR(S)      : Cannon, Bruce L.

It is certified that error appears in the above-identified patent and that said Letters Patent is hereby corrected as shown below:

Column 23,
Lines 3 and 14, delete "θ" and insert -- Φ --.

Signed and Sealed this

Twenty-seventh Day of June, 2006

JON W. DUDAS
*Director of the United States Patent and Trademark Office*